United States Patent [19]

Kuri et al.

[11] 4,104,039

[45] Aug. 1, 1978

[54] PROCESS FOR CONCENTRATING OR LIQUEFYING A SPECIFIED COMPONENT OF A GASEOUS MIXTURE

[75] Inventors: Setuya Kuri, Kamakura; Sinji Fuwa, Yokohama, both of Japan

[73] Assignees: Kuri Chemical Engineers, Incorporated; Chlorine Engineers Corp., both of Tokyo, Japan

[21] Appl. No.: 734,566

[22] Filed: Oct. 21, 1976

[30] Foreign Application Priority Data

Oct. 22, 1975 [JP] Japan .................. 50-126337

[51] Int. Cl.$^2$ ............................................ B01D 53/04
[52] U.S. Cl. ............................................ 55/23; 55/25; 55/58; 55/62; 55/73
[58] Field of Search ............... 55/23, 25, 26, 33, 58, 55/62, 70, 71, 73, 74, 75, 88

[56] References Cited

U.S. PATENT DOCUMENTS

| | | | |
|---|---|---|---|
| 3,085,379 | 4/1963 | Kiyonaga et al. | 55/58 X |
| 3,149,934 | 9/1964 | Martin | 55/58 |
| 3,225,518 | 12/1965 | Skarstrom et al. | 55/58 X |
| 3,282,647 | 11/1966 | Skarstrom et al. | 55/33 X |
| 3,359,198 | 12/1967 | Lengemann | 55/58 X |
| 3,838,553 | 10/1974 | Doherty | 55/58 |
| 3,876,397 | 4/1975 | Taylor | 55/88 X |

*Primary Examiner*—Charles N. Hart
*Assistant Examiner*—Robert H. Spitzer
*Attorney, Agent, or Firm*—Sughrue, Rothwell, Mion, Zinn and Macpeak

[57] ABSTRACT

A process for concentrating or liquefying a specified component of a gaseous mixture, characterized by a combination of a step comprising passing a starting gaseous mixture containing a dilute gaseous substance to be selectively separated into one adsorbing layer of an adsorbing device consisting of a pair of adsorbing layers to allow it to adsorb the gaseous substance to be selectively separated, releasing the remainder of the gaseous mixture, and before the amount of the adsorbed gas in the adsorbing layer reaches saturation, switching the passing of the starting gaseous mixture over to the other adsorbing layer; a step comprising maintaining the pressure of the inside of the adsorbing layer which has adsorbed the gaseous substance lower than the pressure of the starting gaseous mixture fed, feeding a part of the gas released from the other adsorbing layer or an inert gas from outside the system to desorb the adsorbed gas, again passing the starting gaseous mixture after the end of desorption, and switching the desorption of the adsorbed gaseous mixture over to the other adsorbing layer; and a step comprising mixing the desorbed gas with the starting gaseous mixture either directly or after separation of the resulting liquefied gas, and recycling and passing the gaseous mixture through the adsorbing layer; wherein the recycling is repeated until the concentration of the specified component in the recycle gas to be passed into the adsorbing layer reaches the desired concentration or said component is liquefied, and the specified component having attained the desired concentration or the liquefied specified component is continuously recovered to maintain the gas recycling system always in balance and steady state.

9 Claims, 2 Drawing Figures ent invention does not involve such a critical selection

PROCESS FOR CONCENTRATING OR LIQUEFYING A SPECIFIED COMPONENT OF A GASEOUS MIXTURE

BACKGROUND OF THE INVENTION

1. Field of the Invention

This invention relates to a method for concentrating or liquefying a specified dilute gaseous component in a gaseous mixture.

2. Description of the Prior Art

According to conventional techniques, a specified dilute component gas in a gaseous mixture is concentrated either by (1) a vacuum or pressure-reduction method, or (2) a heating method. Method (1) relies on the use of an adsorbing device composed of a pair of adsorbing layers in which the absorption of a given gas is performed in one adsorbing layer while desorption of the adsorbed gas is performed in the other, with this sequence of operations being repeated.

The given gas adsorbed will naturally be desorbed from the adsorbing layer if the pressure is lower than the partial pressure of the given gas component in the starting gaseous mixture. However, because of the existance of adsorption energy, etc., the specified component cannot be desorbed to an extent such that the concentration of this component in the gas to be desorbed reaches an adsorption equilibrium concentration corresponding to the above-mentioned low pressure. For this reason, desorption is carried out while passing a carrier gas into the adsorbing layer so tht the conentration of the specified component becomes not more than the adsorption equilibrium concentration corresponding to the low pressure. The amount R of the carrier gas fed into the adsorption layer at this time can be determined by the following equation:

$$R = \frac{P_0 \times D}{P_1 - P_0} \times \eta$$

wherein $\eta$ is the efficiency coefficient, 1.2 – 10.
 $P_1$ is the pressure of feeding the starting gaseous mixture,
 $P_O$ is the reduced pressure, and
 $D$ is the amount of the gas released.

Since the degree of vacuum that can be used commercially in such a process is about 10 to about 160 Torror more, the starting gaseous mixture can be concentrated only to about 20 to 40 times. For example, when a starting gaseous mixture of 100 ppm is fed, there cannot be obtained a concentrated gas of more than 2000 to 4000 ppm, at P=760 Torr, $P_O$=10 Torr and $\eta$=2.

According to method (2) above, heated nitrogen gas or stream is used, but since this method does not involve a pressure reduction for desorption, it is impossible to obtain a gas which is concentrated to a greater extent than in the case of method (1).

U.S. Pat. No. 2,944,627 Skarstrom process involves conservation of heat evolved at the adsorption cycle, and very rapid cycling is required in the process.

The Skarstrom process does not involve the steps that the recycling is repeated until the concentration of the specified component in the recycle gas to be passed into the adsorbing layer reaches the desired concentration or the component is liquefied, and the specified component having attained the desired concentration or the liquefied specified component is continuously recovered to maintain the gas recycling system in balance and steady state.

U.S. Pat. No. 3,085,379 Kiyonaga et al related to removing impurities, whereas the present invention relates to recovering a particular component.

Referring to Column 4, line 25 et seq of Kiyonaga et al, it appears that compression is necessary, whereas such is not always necessary in the present invention. In Kiyonaga et al, the selection of the desorption stroke pressure is "critical as it determines purity of the gaseous product produced."; in this regard, a specific requirement is posed at Column 6, line 5 et seq. The present invention does not involve such a critical selection of a desorption stroke pressure.

U.S. Pat. No. 3,149,934 Martin required compressing the desorbate and recycling at least a portion thereof to the bottom of the adsorption bed. Further, the feed must be introduced at an intermediate point into the adsorption zone, i.e., at an equilibrium point. This is quite dissimilar in concept from the present invention. Reference to Martin shows that little attention is given to the pressure of desorption. Further, in Martin the zones Y1 and Y2 are saturated with the A component from a previous adsorbant step. Finally, if one refers to Column 4, lines 14 et seq of Martin, the concept of controlling the partial pressure of A is very important in Martin. Such partial pressure considerations are not of critical importance in the present invention.

SUMMARY OF THE INVENTION

When in conventional methods a specific component is to be taken out as a highly concentrated gas from the adsorbing layer on which it has been adsorbed, the gas can be concentrated only 20 to 40 times, even if the desorption is carried out in as high a vacuum as possible.

We have found, however, that when the desorption of a specified component from the adsorbing layer on which it was adsorbed is carried out at a pressure lower than the pressure of the starting gaseous mixture fed, the desorbed gas in then mixed with the starting gaseous mixture, and this procedure is repeated, the concentration of the desorbed gas gradually becomes higher, although the concentration does not greatly increase in one desorption cycle, until theoretically the concentration reaches near 100%.

The present invention is a process based on this finding. It is a process for concentrating or liquefying a specified component of a gaseous mixture, characterized by the combination of steps comprising:

(1) passing a starting gaseous mixture containing a dilute gaseous substance to be selectively separated into one adsorbing layer of an adsorbing device consisting of a pair of adsorbing layers to permit the same to adsorb the gaseous substance to be selectively separated;

(2) releasing the remainder of the gaseous mixture, and, before the amount of the adsorbed gas in the adsorbing layer reaches saturation, switching the passing of the starting gaseous mixture over to the other adsorbing layer;

(3) maintaining the pressure of the inside of the adsorbing layer which has adsorbed the gaseous substance lower than the pressure of the starting gaseous mixture fed;

(4) feeding a part of the gas released from the other adsorbing layer or an inert gas from outside the system to desorb the adsorbed gas;

(5) again passing the starting gaseous mixture after the end of desorption and switching the desorption of the adsorbed gaseous mixture over to the other adsorbing layer; and (6) mixing the desorbed gas with the starting gaseous mixture either directly or after separation of the resulting liquefied gas, and recycling and passing the gaseous mixture through the adsorbing layer, wherein the recycling is repeated until the concentration of the specified component in the recycle gas to be passed into the adsorbing layer reaches the desired concentration or the component is liquefied, and the specified component having attained the desired concentration or the liquefied specified component is continuously recovered to maintain the gas recycling system in balance and steady state.

BRIEF DESCRIPTION OF THE DRAWINGS

The invention will be described by reference to the accompanying drawings, wherein.

DETAILED DESCRIPTION OF THE INVENTION

Figure 1:
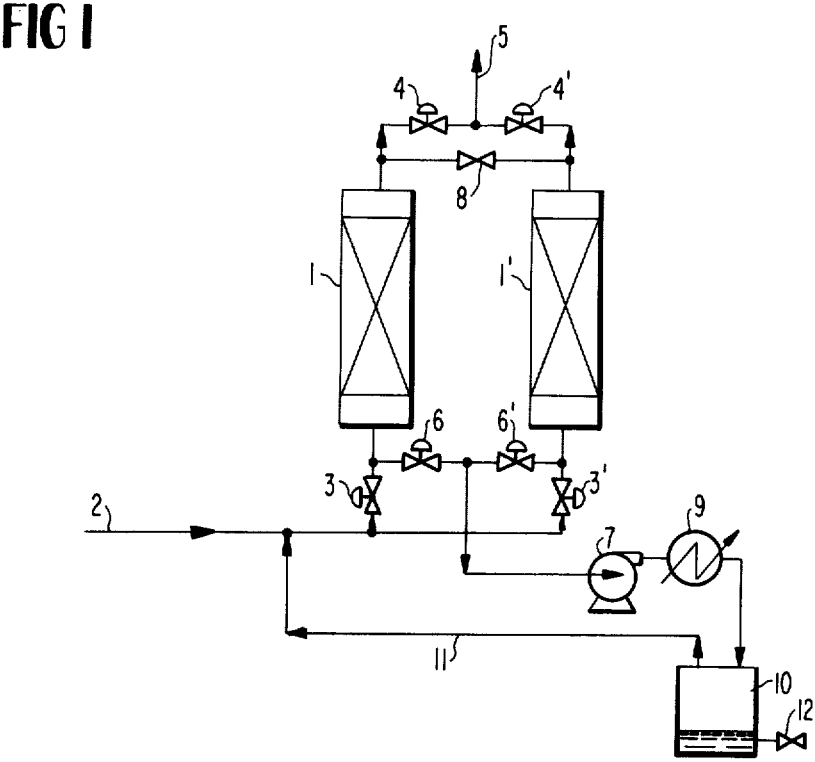
FIG. 1 shows the case wherein a gaseous substance having a relatively low vapor pressure is contained in a starting gaseous mixture, and the gaseous substance is liquefied by concentration.
Figure 2:
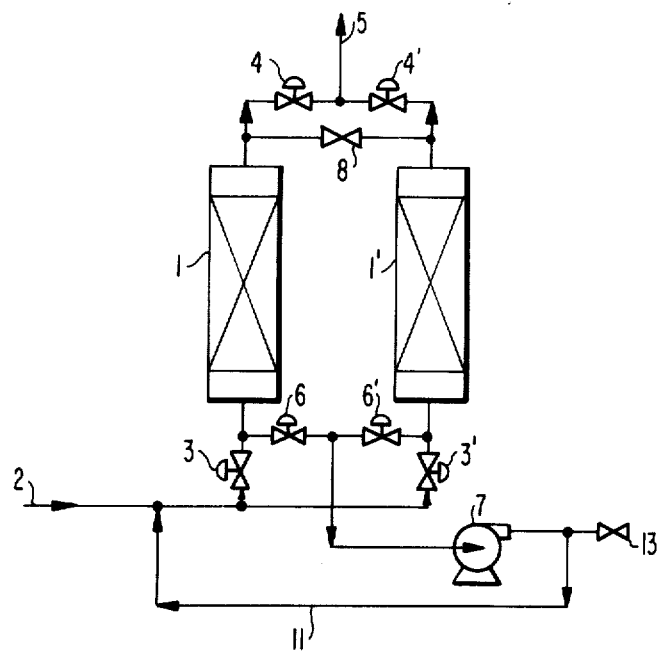
FIG. 2 shows the case where a gaseous substance having a relatively high vapor pressure is contained in a starting gaseous mixture, and the gaseous substance is not liquefied by concentration.

Referring to the drawings, the drawings illustrate the outlines of examples of apparatus for practicing the present invention FIG. 1 shows the case where a gaseous substance to be selectively separated from a starting gaseous mixture has a high boiling point and is liquefied by concentration, while FIG. 2 shows the case wherein a gaseous substance to be selectively separated from a starting gaseous mixture has a low boiling point and is not liquefied by concentration. In the drawings, 1 and 1' are adsorbant layers; 2 is a pipe for feeding a a starting gaseous mixture; 3, 3', 4, 4', 6, 6' and 8 are switch-over valves; 5 is an exhaust pipe; 7 is a vacuum pump; 9 is a cooler; 10 is a condensing tank and 11 is a line for transporting a desorbed gas.

Referring to FIGS. 1 and 2, reference numerals 1 and 1' represent a pair of adsorbing layers, which are operated such that when a starting gaseous mixture is being fed into one adsorbing layer the other is operated so as to desorb the gaseous substance adsorbed on this other layer. The starting gaseous mixture is fed into the adsorbing layer 1 from gas feed pipe 2 via valve 3, and after adsorption of the gaseous substance to be selectively separated from the starting gaseous mixture, the remainder is released from the system via release pipe 5 via valve 4. At this time, valves 3', 4' and 6' are closed. Before adsorbing layer 1 is saturated with the gaseous substance, the valves 3 and 4 and valve 6 are then closed, and valves 3' and 4' are opened to feed the starting gaseous mixture into adsorbing layer 1'. The gaseous substance be selectively separated is adsorbed, and then the remainder is released from the system from the release pipe 5 via the valve 4'. Simultaneously therewith vacuum pump 7 is driven and valve 6 is opened to reduce the pressure of the interior of the adsorbing layer lower than the feed pressure of the starting gaseous mixture. Further, a portion of the remaining gas exhausted from the adsorbing layer 1' is fed through valve 8.

The exhaust gas from the vacuum pump 7 is, in the case of FIG. 1, fed to a cooler 9 and a condensate tank 10 to recover it as a liquefied gas, and an uncondensed gas is fed into the starting gaseous mixture feed pipe 2 via line 11.

In the case of FIG. 2, the exhaust gas from the vacuum pump 7 is directly fed into feed pipe 2 and recycled.

In the above description, a vacuum pump is used in order to desorb the adsorbed gaseous substance from the adsorbing layer. The present invention, however, is not limited to pressure reduction of the interior of the adsorbing layer(s) by means of vacuum pump to desorb the same but any optional means of rendering the pressure $P_0$ of the interior of the adsorbing layer lower than the feed pressure $P_1$ of the starting gaseous mixture can be used to ahcieve the effects of the present invention. For example, where $P_1$ is atmospheric pressure, $P_0$ must be at reduced pressure and the pressure reduction means will typically be a vacuum pump; on the other hand, where $P_0$ is 1 atmosphere, $P_1$ must be at elevated pressure. By repeating adsorption, desorption and recycling desorbed gas in the above manner using a pair of adsorbing layers 1 and 1', a concentrated or liquefied gaseous substance can be obtained.

Reference numeral 12 represents a valve for withdrawing liquefied gas, and reference numeral 13 a valve for withdrawing concentrated gas.

When in the present invention the concentration of resulting concentrated gas reaches the desired concentration or where a liquefied gas begins to condense, the gaseous substance having attained the desired concentration or the liquefied gas is withdrawn from the system in an amount corresponding to the gaseous substance to be selectively separated which is present in the starting gaseous mixture fed to the adsorbing layer(s). Hence, the gas recycling system is maintained in balance and steady state, and a gaseous substance having a definite high concentration or a liquefied gas can be recovered over extended periods of time.

It is to be specifically noted that the starting material treated in accordance with the present invention is not limited in any specific fashion and that the selection of the adsorbent used is determined by the starting material employed. One skilled in the art can easily determine, from the starting material, the kind of component to be adsorbed and the kind of adsorbant material which should be used.

However, considering, for example, the case of adsorbing and separating oxygen and nitrogen from air using molecular sieves, where nitrogen is adsorbed to separate oxygen with a concentration of about 95%, the adsorption of oxygen reaches the same degree as that of nitrogen, and, as a result, separation can no longer be performed. The process according to the present invention is not applicable to such a gaseous mixture in which separation utilizing adsorption cannot be completely conducted. This is due to the fact that the molecular diameter of oxygen and nitrogen is not so different and the difference in polarity of oxygen and nitrogen is small.

Therefore, it can generally be said that the starting gaseous mixture for the process according to the present invention. must satisfy at least one of the following requirements:

(1) The difference in the molecular diameter of the off-gas component and the adsorbate component must be large; and (2) The difference in the polarity of the off-gas component and the adsorbate component must be great.

Thus, the starting gaseous mixture employed in the process of the present invention must be composed of the components satisfying the above requirement.

The off-gas components in the starting gaseous mixture used in the process of the present invention have a relatively small molecular diameter and a polarity of zero or substantially zero, and examples thereof include $H_2$, $O_2$, He, $N_2$ and the like.

The adsorbate component(s) in the starting gaseous mixture used in the process of the present invention have a molecular diameter larger than that of the off-gas components and/or a polarity larger than that of the off-gas components. Examples thereof are: (a) inorganic compounds having a polarity of greater than $0.5 \times 10^{-18}$ C.G.S. e.s.u., e.g., $H_2O$, $CO_2$, $NH_3$, $Cl_2$, HCl, HBr, HF, $SO_2$ or the like; (b) organic compounds having a relatively small molecular diameter but a polarity of greater than $0.5 \times 10^{-18}$ C.G.S. e.s.u., e.g., formalin, other halides, amines (e.g., methylamine) or the like; and (c) compounds having a relatively large molecular diameter, e.g., aromatic compounds (e.g., benzene, toluene, xylene, phenol, etc.), ketones (e.g., acetone, methyl ethyl ketone, etc.), alcohols (e.g., methanol, ethanol, etc.), olefins having at least 3 carbon atoms (e.g., propylene, butylene, etc.) Freon, vinyl chloride, etc., paraffins having at least 4 carbon atoms (e.g., butane, hexane, etc.) or the like.

The kind of adsorbant material can be determined by the adsorbate material and the selection thereof will be obvious to one skilled in the art. Namely, according to the process of the present invention the following combinations are preferred: where the starting gaseous mixture contains the above-mentioned inorganic compounds (a) or oganic compounds (b) as the adsorbate component, it is preferred to use a zeolite, molecular sieves or silica gel as the adsorbent, while on the contrary, when the starting gaseous mixture contains the abovementioned compounds (c) as the adsorbate component, it is preferred to use activated carbon as an adsorbent.

Examples of useful zeolites include natural zeolites, e.g., mordenite and examples of Molecular Sieves (Linde Co.) include types 4A, 5A and 13X.

Additional examples of gaseous substances to be selectively separated include not only toxic gases such as hydrocarbons, ammonia hydrogen sulfide, sulfurous acid gas, mercaptan and organic solvents, but also any other gases which can be adsorbed on the above adsorbant. Since the type and amount of the gaseous substance to be adsorbed differ according to the type of the adsorbant, an adsorbant suitable for the gaseous substance(s) to be adsorbed should be used.

The degree of pressure difference between the adsorbing and desorbing bed and the cycle time and flow rate are impossible to treat individually, but they do have a certain relationship. In this regard, reference is made to, for example, FIG. 1, though the formulae below are of general application, wherein Co is the amount (volume) of adsorbate gas in the feed (SGM); D is the amount (volume) of primary off-gas; R is the amount (volume) of back-wash gas; $P_1$ is the feed SGM pressure; $P_0$ is the reduced pressure; and $n$ is the number of recycles until the concentration of the specified component in the recycled gas to be passed into the adsorbing layer reaches the desired concentration or the component is liquefied. The recycle gas concentration Cn (% in volume) is represented by the following equation:

$$Cn = \frac{nCo}{nCo + R} \times 100 \qquad (I)$$

$$\text{Since, } R = \frac{P_0 D}{P_1 - P_0} \times \eta \qquad (II)$$

wherein $\eta$ is a coefficient determined by the adsorbant and the adsorbate component, generally of a value of from about 1.2 to about 10 (smaller values mean easier desorption), $$Cn(\%) = \frac{nCo}{nCo + \frac{P_0 D}{P_1 - P_0} \times \eta} \times 100 \qquad (III)$$

In the process of the present invention it is preferred from the economical and industrial point of view that the concentration of Co be from 0.01 to 10% (by volume), more preferably from 0.1 to 10% (by volume). The recycling number $n$ is at least 5, preferably at least 50. No specific limitation is posed to the upper limit of the recycling number. The amount of SGM (feed gas) is the total amount Co + D. On the other hand, the concentration of Co is from 0.01 to 10% (by volume). Therefore, the concentration of primary off-gas D in the feed gas is calculated as follows:

100 − (from 0.01 to 10) = from 90 to 99.99 (% by volume).

Thus, the concentration of D ranges 90 − 99.99% (by volume), preferably 90 − 99.9% (by volume).

Further, by reducing the value of $P_0/P_1 - P_0$ as much as possible, the volume of recycle gas and the capacity of the recycle pump (a compressor or a vacuum pump) becomes small, the number of recycles until reaching operation in balance and steady state, i.e., the recycling time until reaching balance and steady state operation is short. In view of technical and industrial viewpoints $P_0/P_1 - P_0$ has a value not larger than about 0.3, preferably not larger than 0.1. For example, it is preferred that where $P_1$ is 1 atm, $P_0$ be from about 10 to about 160 mmHg, and where $P_0$ is 1 atm, $P_1$ be from about 5 to about 10 atm.

With respect to temperature, temperature is not a critical feature in the process of the present invention, and operation is generally initiated at room temperature, though with operation some temperature rise might be caused due to heat of adsorption and/or desorption. Generally, operation at very high temperatures is not preferred.

After the recycle gas reaches the desired concentration (Cn) or the liquefication-saturation concentration (Cn) after $n$ times of recycling, a portion of the recycle gas containing adsorbate Co in the SGM is completely recovered and the residual recycle gas containing the balance (nCo-Co) is recycled or the residual gas of which supersaturated adsorbate is liquefied is recycled, whereby the system as a whole is under operation in balance and steady state, and thereafter, the adequate in the SGM is completely removed and is continuously recovered at the desired concentration.

Thus, the terminology "at operation in balance and steady state" is proper, and such is distinguished from the prior art concept of operation at equilibrium.

Reference is specifically made to terminology such as "(operation at) equlibrium" as is commonly used in the prior art. In the processes of the prior art, the use of the term "equilibrium" might be proper and correct. However, in the process of the present invention the term "equilibrium" is not proper and is incorrect.

According to the present invention, even a gaseous mixture containing an extremely small amount of a gaseous substance to be selectively separated can be treated to separate the gaseous substance in a concentrated or partly liquefied form by rendering the pressure of the interior of the adsorbing layer lower than the pressure of the starting gaseous mixture to desorb the adsorbed gaseous substance, recycling the desorbed gas and mixing it with the gaseous mixture, and repeating the above-mentioned recycling and mixing steps without the need to use a vacuum pump at a high vacuum or to provide a large pressure difference by using a high pressure feed gas to desorb the adsorbed gas from the adsorbing layer.

It is to be noted that in accordance with the present invention the switching time, i.e., the time that an individual bed is on an adsorption cycle or a desorption cycle, is from about 1 to about 30 minutes for most cases.

Accordingly, when in the present invention the concentration of the resulting concentrated gas reaches the desired value or where a liquefied gas begins to condense, the gaseous substance having attained the desire concentration or the liquefied gas is withdrawn from the system in an amount corresponding to the gaseous substance to be selectively separated which is contained in the starting gaseous mixture to be fed into the adsorbing layers. Hence, the gas recycling system can be maintained in balance and steady state and a gaseous substance having a definite high concentration or a liquefied gas can be recovered for extended periods of time.

Having thus generally described the invention, the following Examples are offered to further illustrate the same.

The Examples were at room temperature.

EXAMPLE 1

Using an apparatus of the type shown in FIG. 1, 7l/min. of a nitrogen gas containing 2% by volume of methyl ethyl ketone was subjected to repeated adsorption/desorption using a pair of adsorbant layers under the following conditions to concentrate the methyl ethyl ketone:

Adsorbant material filled in the adsorbing layer: activated carbon 1.5 Kg/adsorbing layer;
Pressure of the starting gas introduced to the adsorbant layer: 0.05 Kg/cm².g;
Amount of carrier gas fed into the adsorbant layer through valve 8: 6l/min.;
Switch-over time for the adsorbant layers: 8 min.;
Internal pressure of the adsorbant layer at the time of desorption: 80 Torr;
Recycling number $n$: 9 times.

In Example 1, the value of the parameters of the earlier given formulae were as follows:

| | |
|---|---|
| n | : 9 (time: 72 min.) |
| Concentration of Co in feed gas | : 2% (0.14l/min.) |
| Concentration of D in feed gas | : 98% (6.86l/min.) |
| R | : 6l/min. |
| $P_1$ | : 760 × 1.05 = 798 mmHg |
| $P_0$ | : 80 mmHg |
| $P_1 - P_0$ | : 718 mmHg |
| $P_0/P_1 - P_0$ | : 0.11 |
| Concentration basis | Volume basis |
| $Cn = \dfrac{nCo}{nCo + R} \times 100$ | $Cn = \dfrac{nCo}{nCo + R} \times 100$ |
| $= \dfrac{9 \times 2}{9 \times 2 + 0.11 \times 98\eta} \times 100$ | $= \dfrac{9 \times 0.14}{9 \times 0.14 + 6} \times 100$ |
| | $= 17.35(\%)$ |

On the other hand, $$R = \frac{P_0 D}{P_1 - P_0} \times \eta$$

$$6 = 0.11 \times 6.86 \times \eta$$

$$\eta = 7.95$$

Therefore, $$Cn = \frac{9 \times 2}{9 \times 2 + 0.11 \times 98 \times 7.95} \times 100$$

$$= 17.35(\%)$$

The value 17.35% obtained above is a calculated value; the actual value measured in Example 1 was 10.5% which is the saturation point for MEK.

After about 1.2 hours (that is, after recycling about 9 times), methyl ethyl ketone was slightly liquefied into the condensing tank. Thereafter, it could be continuously recovered as a liquid.

EXAMPLE 2

Using an apparatus of the type shown in FIG. 1, 10 l/min. of air containing 0.1% by volume of gaseous ammonia was subjected to repeated absorption/desorption using a pair of adsorbant layers under the following conditions to concentrate the ammonia gas:

Adsorbant material which comprised the adsorbant layer: Molecular Sieve 5A/silica gel (1/1 weight ratio), 2 Kg/adsorbing layer;
Pressure of the starting gas introduced into the adsorbant layer: 0.05 Kg/cm².g.;
Carrier gas fed into the adsorbant layer via valve 8: 1l/min.;
Switch-over time for the adsorbant layers: 10 min.;
Internal pressure at the time of desorption: 15 Torr;
Recycling number $\eta$: 840 times.

In Example 2 the values for the parameters in the earlier formulae were as follows:

| | |
|---|---|
| n | : 840 (time: 8400 min.) |
| Concentration of Co in feed gas | : 0.1% (0.1l/min.) |
| Concentration of D in feed gas | : 99.9% (9.99l/min.) |
| R | : 1l/min. |
| $P_1$ | : 760 × 1.05 = 798 mmHg |

-continued

| | |
|---|---|
| $P_0$ | : 15 mmHg |
| $P_1 - P_0$ | : 783 mmHg |
| $P_0/P_1 - P_1$ | : 0.02 |
| Concentration basis | Volume basis |
| $Cn = \dfrac{nCo}{nCo + R} \times 100$ | $Cn = \dfrac{nCo}{nCo \times R} \times 100$ |
| $= \dfrac{840 \times 0.1}{840 \times 0.1 + 0.02 \times 99.9 \times \eta} \times 100$ | $= \dfrac{840 \times 0.01}{840 \times 0.01 + 1} \times 100$ |
| | $= 89\ (\%)$ |

On the other hand, $$R = \frac{P_0 D}{P_1 - P_2} \eta$$

$$1 = 0.02 \times 99.9 \times \eta$$

$$\eta = 5.0$$

Therefore $$Cn = \frac{840 \times 0.01}{840 \times 0.1 + 0.02 \times 99.9 \times 5.0} \times 100$$

$$= 89(\%)$$

The value 89% obtained above is a calculated value; the actual value measured in Example 2 was about 80%.

After about 140 hours (that is, after recycling about 840 times), it was found that the ammonia concentration in the recycle gas reached 80% by volume. Thereafter, 80% volume ammonia was continuously withdrawn from the system.

While the invention has been described in detail and with reference to specific embodiments thereof, it will be apparent to one skilled in the art that various changes and modifications can be made therein without departing from the spirit and scope thereof.

What is claimed is:

1. A process for concentrating or liquefying a specified component of a gaseous mixture as a product, characterized by a combination of a step comprising passing a starting gaseous mixture containing a dilute gaseous substance to be selectively separated as said specified component into one adsorbing layer of an adsorbing device consisting of a pair of adsorbing layers to allow it to adsorb the gaseous substance to be selectively separated, releasing the remainder of the gaseous mixture, and before the amount of the adsorbed gas in the said one adsorbing layer reaches saturation, switching the passing of the starting gaseous mixture over to the other of said adsorbing layers; a step comprising maintaining the pressure of the inside of the adsorbing layer which has adsorbed the gaseous substance to be selectively separated lower than the pressure of the starting gaseous mixture fed, feeding a part of the gas released from the other adsorbing layer which now has a low concentration of the gaseous substance to be selectively separated or an inert gas from outside the system to desorb the adsorbed gas and to obtain a gas rich in said gaseous substance to be selectively separated, again passing the starting gaseous mixture after the end of desorption into said one adsorbing layer, and switching the desorption of the adsorbed gaseous mixture over to the said other adsorbing layer; and a step comprising mixing the desorbed gas which is rich in said gaseous substance to be selectively separated with the starting gaseous mixture either directly or after separation of the resulting liquefied gas to thereby increase the concentration of said gaseous substance to be selectively separated in said starting gaseous mixture, and recycling and passing the resulting gaseous mixture having the increased concentration of said gaseous substance to be selectively separated through the adsorbing layer; wherein the recycling is repeated until the concentration of the specified component in the recycle gas to be passed into the adsorbing layer increases to the desired concentration or said component is liquefied, and the specified component having attained the desired concentration or the liquefied specified component is thereafter continuously recovered to maintain the gas recycling system always in balance and steady state while continuing the recycling, further, wherein the recycle gas concentration Cn (% by volume) is represented by the following general formula:

$$Cn(\%) = \frac{nCo}{nCo + \dfrac{P_0 D}{P_1 - P_2} \times N} \times 100$$

wherein Co is the volume of adsorbate gas in the feed, D is the volume of primary-off gas, $P_1$ is the pressure of the feed starting gaseous mixture, $P_0$ is the reduced pressure, $n$ is the recycling number until the concentration of the specified component in the recycle gas to be passed into the adsorbing layer reaches the desired concentration or said component is liquefied, Cn is the recycled gas concentration, wherein the concentration of Co is from 0.01 to 10% (by volume), the recycling number $n$ is at least 5, $P_0/P_1 - P_0$ is a value not larger than about 0.3, and N is a value of from about 1.2 to about 10.

2. The process of claim 1, wherein the concentration of Co is from 0.1 to 10% (by volume).

3. The process of claim 1, wherein $P_0/P_1 - P_0$ is a value not larger than 0.1.

4. The process of claim 1, wherein D ranges from 90 to 99.99 percent by volume.

5. The process of claim 1, wherein said recycling is performed at least 50 times.

6. The process of claim 1, wherein none of said dilute gaseous substance to be selectively separated is removed until the recycling for at least 5 times is completed.

7. The process of claim 1, wherein said recycling is repeated until the concentration of the specified component reaches the desired concentration.

8. The process of claim 1, wherein said recycling is repeated until said component is liquefied.

9. The process of claim 1, wherein said recycling and passing said resulting gaseous mixture having the increased concentration of said gaseous substance to be selectively separated through the adsorbing layer is conducted in a manner such that all of the desorbed adsorbed gas is recycled to said adsorbing layer.

* * * * *